(12) United States Patent
Götzenberger

(10) Patent No.: US 6,919,649 B2
(45) Date of Patent: Jul. 19, 2005

(54) POWER SUPPLY DEVICE

(75) Inventor: Martin Götzenberger, Ingolstadt (DE)

(73) Assignee: Siemens Aktiengesellschaft, Munich (DE)

(*) Notice: Subject to any disclaimer, the term of this patent is extended or adjusted under 35 U.S.C. 154(b) by 5 days.

(21) Appl. No.: 10/754,773

(22) Filed: Jan. 9, 2004

(65) Prior Publication Data

US 2004/0150265 A1 Aug. 5, 2004

(30) Foreign Application Priority Data

Jan. 16, 2003 (DE) .......................................... 103 01 503

(51) Int. Cl.[7] ................................................ H02J 1/00
(52) U.S. Cl. ......................................................... 307/31
(58) Field of Search ................................ 307/11, 31, 35

(56) References Cited

U.S. PATENT DOCUMENTS 3,697,768 A * 10/1972 Johnston ...................... 307/31

* cited by examiner

Primary Examiner—Shawn Riley
(74) Attorney, Agent, or Firm—Baker Botts L.L.P.

(57) ABSTRACT

A power supply device comprises a power generating circuit which provides a supply current as a function of a control signal, a regulator to which a reference signal and a regulation signal corresponding to the supply current, are input, in order to provide the control signal, and a reference device providing the reference signal, with a normal state being provided in which the supply current is provided for the electrical loads which are operated at the rated voltage and the input signal difference of the regulator is zero. A regulation characteristic starts from the normal state, whereby a sudden reduction in the operating voltage from the rated voltage to a rated minimum voltage which is necessary for operation of the loads leads to a rise in the supply current by at least 20% of the maximum supply current which can be provided by means of the power generating circuit.

20 Claims, 5 Drawing Sheets

POWER SUPPLY DEVICE

PRIORITY

This application claims foreign priority of the German application DE 10301503.5 filed on Jan. 16, 2003.

1. Technical Field of the Invention

The present invention relates to a power supply device.

2. Description of the Related Art

Figure 1:
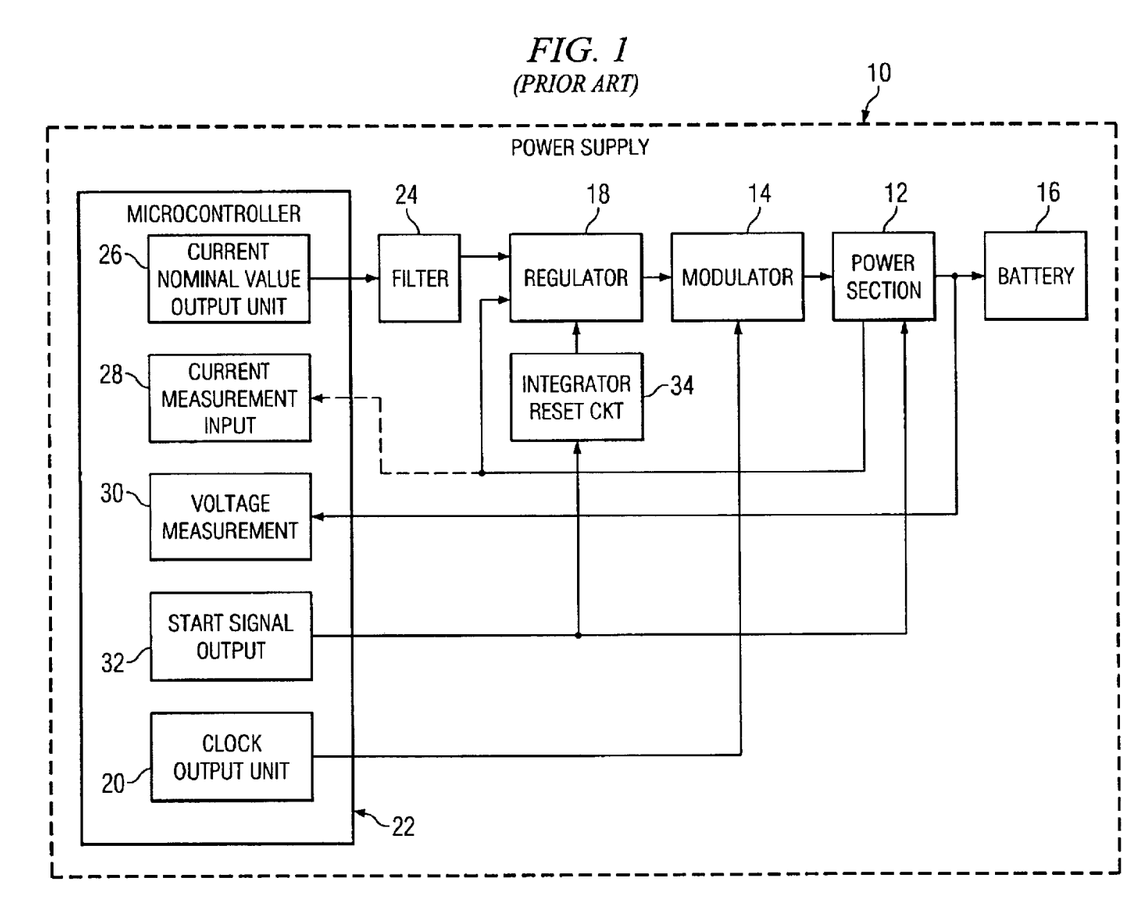
FIG. 1 shows a schematic block diagram of a power supply device in which higher-level voltage regulation is provided by means of a microcontroller.

In order to understand the invention better, a power supply device which is constructed in a known manner will be described first of all in the following text, with reference to an exemplary embodiment which is illustrated in FIG. 1.

FIG. 1 shows a power supply device which is annotated 10 overall and is in the form of a DC/DC converter in a two-voltage vehicle power supply system in a motor vehicle, in order to provide a supply current for electrical loads which can be operated with a rated voltage of 14 V, based on a vehicle power supply system voltage of 42 V.

The expression "rated voltage", as used here, refers to that operating voltage which is specified for the electrical loads. This must be distinguished from a "rated minimum voltage" for these loads, which refers to the minimum operating voltage which is necessary for reliable operation of the loads. The rated minimum voltage of 14 V loads in the field of motor vehicles is typically about 8 V.

Based on a first vehicle power supply system with a first DC voltage (in this case: 42 V), the object of the power supply device 10 is to provide a second vehicle power supply system with a second DC voltage (in this case: 14 V) which is not the same as the first, and to keep the second DC voltage as constant as possible, particularly when load changes occur in the area of the loads.

The power supply device 10 comprises a power generating circuit 12, which is supplied with the first DC voltage of 42 V and to which a square-wave PWM voltage signal is input as the control signal from a PWM (pulse width modulation) modulator 14 in order to provide the supply current for the electrical loads which can be operated with an operating voltage of 14 V, as a function of this control signal. Although these loads are not illustrated in FIG. 1, the figure does show a battery 16 for the second DC voltage network (14 V). The power generating circuit 12 is designed in a manner known per se, for example as a step-down controller (power section) with switching transistors which are driven by the PWM control signal and produce the output voltage across a capacitor, via an inductor. In a design such as this, the supply current which results for a specific control signal depends on the actual operating voltage of the electrical loads. The operating voltage varies, for example, in the event of suddenly occurring load changes, such as those which are caused when individual loads are switched on and off. The supply current and the PWM duty ratio are correlated only indirectly. For example, a specific duty ratio may correspond to a specific voltage at the output of a power section driver stage which is formed from two power transistors (bridge circuit). To a first approximation, the output current is then the integral of the difference between this driver output voltage and the prevailing (downstream from the inductor) voltage (with which the electrical loads are supplied). In the regulation process which is described in the following text, the PWM duty ratio is then set for a predetermined output load such that the two voltages match (except for compensation for any losses).

The PWM modulator 14 is used to convert an analog control signal, which is input on the input side from a regulator 18, to the PWM control signal which is emitted on the output side to the power generating circuit 12. The illustrated modulator 14 for this purpose contains a sawtooth-waveform oscillator, in a manner known per se, in order to produce a sawtooth-waveform signal, as well as a comparator in order to compare this sawtooth-waveform signal with the input analog signal, so that the PWM signal is obtained as the comparison result of the output of the comparator. This design results in a linear relationship between a change in the analog signal (control signal) and the duty ratio of the PWM signal. The frequency of the sawtooth-waveform oscillation is in this case predetermined by a clock output unit 20 of a microcontroller 22, which emits a clock signal to the modulator 14 during operation of the device 10. In the illustrated example, this frequency is 150 kHz, but may, of course, assume other values, depending on the specific application. A frequency of up to several kHz is expedient for most DC/DC converters.

The regulator 18 is in the form of a PI (proportional/integral) regulator, to which an analog reference signal (which is emitted from a filter 24 and which corresponds to a predetermined reference variable) as well as a regulation signal which corresponds to the supply current that is provided are input, in order to form the control signal to output it to the modulator 14. The regulation signal is produced as a measurement signal in the region of the power generating circuit 12, and is fed back as an analog signal, which represents the current that is output to the battery 16, in order to regulate the supply current.

An input signal difference of the regulator 18 leads in a known manner to a control signal component which is proportional to this, and which at the same time leads (owing to the integration component of the regulator characteristic) to a control signal component which corresponds to the time integral of the input signal difference. The integral component of the regulator characteristic leads to the controlled variable (in this case the supply current) being matched to the predetermined reference variable (in this case the supply current nominal value) during regulated operation. The so-called control error (input signal difference) is advantageously regulated out completely, so that the control loop which is formed by the regulator 18, the modulator 14 and the power generating circuit 12 sets the supply current that is emitted virtually exactly to the predetermined reference variable. This is still the case even when a disturbance variable is acting on the controlled system.

In the illustrated embodiment, the filter 24 is used to convert the reference signal that is emitted as the PWM signal from a current nominal value output unit 26 of the microcontroller 22 to the analog reference signal which is input to the regulator 18.

The regulation signal, which is fed back to the regulator 18 and corresponds to the instantaneous supply current (illustrated by dashed lines) can be input to a current measurement input 28 of the microcontroller 22, for example in order to carry out a plausibility check on the basis of this signal, and/or to make it possible to detect a defect in the power supply device 10.

The microcontroller 22 also has a voltage measurement input 30, to which the instantaneous operating voltage at the output of the power section 12 is input as a measurement variable, so that, in the event of any discrepancy between the operating voltage and the rated voltage of the electrical loads, program-controlled operation of the microcontroller allows the current nominal value, which is predetermined by the current nominal value output unit 26, to be changed appropriately. The feedback of the operating voltage to the microcontroller 22 and the current nominal value preset which is carried out as a function of this operating voltage thus provides so-called higher-level regulation which, in the end, ensures that the operating voltage for the electrical loads is regulated at their rated voltage.

Finally, the microcontroller 22 has a start signal output unit 32 which, when the device 10 is started up, emits a start signal to the power generating circuit 12 and, via an integrator reset circuit 34, to the regulator 18.

In summary, the described power supply device 10 provides a current regulator that is formed from the described functional blocks (hardware), and a voltage regulator which operates under program control (software). The known device 10 has the disadvantage that maintenance of the rated voltage at the output of the power section 12 even when load fluctuations occur, can in practice be ensured only by means of a relatively fast microcontroller 22, and that the device operates reliably only for slow changes in the operating voltage when using a comparatively slow microcontroller. Slow operating voltage changes may be achieved approximately by operation of the electrical loads via a battery of a greater or lesser size (such as the illustrated battery 16) or at least one very large output capacitor (double-layer capacitor).

A further power supply device which is designed on the basis of known principles will be described in the following text with reference to FIG. 2, using the same reference numbers for components having the same effect and with regard to which reference should be made to the previous description.

Figure 2:
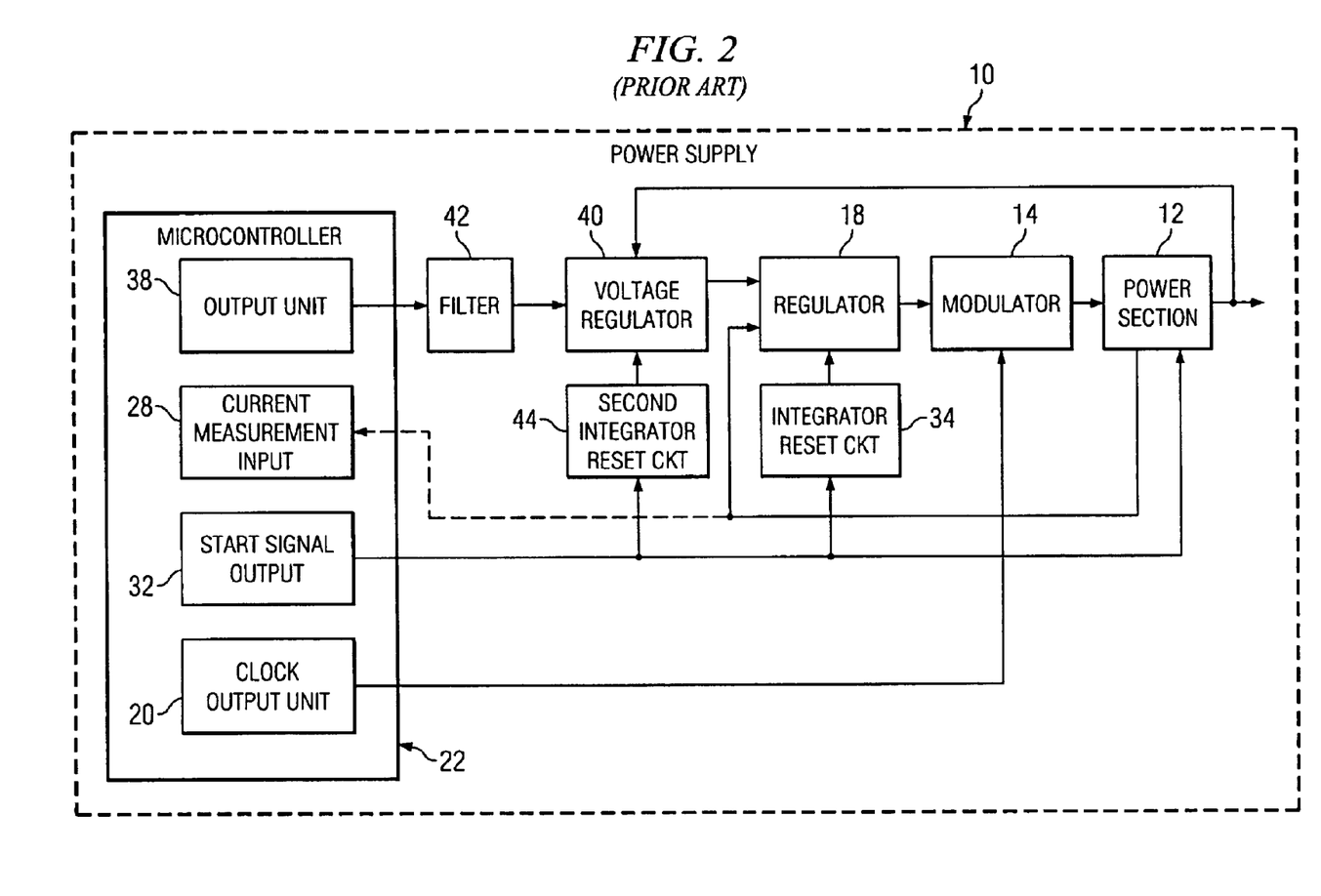
FIG. 2 shows a schematic block diagram of a further power supply device, in which higher-level voltage regulation is provided outside a microcontroller which is used for presetting an operating voltage nominal value.

The variant which is illustrated in FIG. 2 is suitable for operation with a relatively slow microcontroller 22 and/or with a small capacitor at the output of the power generating circuit 12, since the microcontroller 22 only predetermines a fixed nominal operating voltage value (rated voltage) by means of a voltage nominal value output unit 38 in the course of the regulation process. The operating voltage for the electrical loads is in this embodiment regulated by means of a voltage regulator 40 which is at a higher level than the current regulator 18 and which receives as a reference variable a reference variable which is emitted as a PWM signal from the output unit 38 and is converted by means of a filter 42 to an analog signal. Furthermore, the instantaneous operating voltage which is tapped off at the output of the power generating circuit 12 is supplied to a second input of the voltage regulator 40 which, like the current regulator 18, is in the form of a PI regulator and inputs an analog output signal to the current regulator 18 as a reference signal. In order to reset the integrator, a second integrator reset circuit 44 is provided within the regulator 40 and is likewise supplied with the start signal that is provided by the start signal output unit 32.

The power supply device which is illustrated in FIG. 2 may be regarded as a so-called cascaded regulator structure, in which the lower-level regulator (current regulator 18) is sufficiently fast to allow any reaction from a changing operating voltage on the lower-level regulation to be regarded as constant. The lower-level regulator 18 in this case leads to a response of the equivalent path 14, 12 which indicates a pure proportional response for the higher-level regulator (voltage regulator 40) in the relevant range. In general, the lower-level regulator 18 in the device 10 is configured so as to ensure that stabilization at a small control error occurs as quickly as possible. This is equivalent to a relatively high proportional component in the regulation characteristic of the regulator 18.

In summary, although the device 10 illustrated in FIG. 2 allows operation with a slow microcontroller 22, greater circuitry complexity is, however, required for the higher-level voltage regulation.

The two described power supply devices each provide a normal state in which the supply current for the electrical loads which are operated with the rated voltage is provided, and the current regulator input signal difference is zero.

SUMMARY OF THE INVENTION

One object of the present invention is to provide a power supply device of the type mentioned initially which has a simple design and nevertheless allows satisfactory power supply operation.

This object is achieved by a power supply device for provision of a supply current for electrical loads which can be operated at a rated voltage, comprising a power generating circuit which is supplied with a predetermined voltage that is not the same as the rated voltage and to which a control signal is input, in order to provide the supply current for the electrical loads as a function of the control signal, a regulator to which a reference signal, which corresponds to a predetermined reference variable, and a regulation signal, which corresponds to the supply current that is provided, are input, in order to provide the control signal with a control signal component which varies linearly with an input signal difference of the regulator, and a reference device for provision of the reference signal, wherein the power supply device provides a normal state in which the supply current is provided for the electrical loads which are operated at the rated voltage and the input signal difference of the regulator is zero, and wherein the regulator provides a regulation characteristic such that, starting from the normal state, a sudden reduction in the operating voltage for the electrical loads from the rated voltage to a rated minimum voltage which is necessary for operation of the loads leads to a rise in the supply current by at least 20% of the maximum supply current which can be provided by means of the power generating circuit.

The control signal which is provided by the regulator can vary essentially linearly with an input signal difference of the regulator. The power generating circuit can be in the form of a PWM-controlled switch-mode power supply. The control signal which is provided by the regulator, can be input to the power generating circuit as a PWM signal. The control signal can be provided by the regulator as an analog signal, and is converted to the PWM signal by means of a PWM modulator which is connected downstream from the regulator. The reference signal can be provided as the PWM signal by a control device, in particular by a programmable digital control device. The reference signal which is provided by the control device can be converted to an analog reference signal by means of a filter which is connected downstream from the control device, and is input to the regulator as an analog signal. A measurement signal which corresponds to the operating voltage of the electrical loads can be input to the control device. The control device can be designed to predetermine the reference variable as a function of the input measurement signal, in order to provide higher-level operating voltage regulation. The reference variable which is dependent on the measurement signal can be predetermined periodically by the control device, with the period being shorter than the stabilization time of the control loop which is formed by the regulator and the power generating circuit.

The object can also be achieved by a method for provision of a supply current for electrical loads which can be operated at a rated voltage, comprising the steps of:

providing a predetermined voltage that is not the same as the rated voltage;

providing the supply current for the electrical loads as a function of a control signal, providing a reference signal, which corresponds to a predetermined reference variable, and a regulation signal, which corresponds to the supply current, providing the control signal with a control signal component which varies linearly with an input signal difference of the reference signal and the regulation signal, wherein during a normal state the supply current is provided for the electrical loads which are operated at the rated voltage and the input signal difference of the reference signal and the regulation signal is zero, and during a regulation state, starting from the normal state, a sudden reduction in the operating voltage for the electrical loads from the rated voltage to a rated minimum voltage which is necessary for operation of the loads leads to a rise in the supply current by at least 20% of the maximum supply current which can be provided.

The control signal may vary essentially linearly with an input signal difference of the reference signal and the regulation signal. The control signal can be provided as an analog signal, and is converted to a PWM signal by means of a PWM modulator. The reference signal can be converted to an analog reference signal by means of a filter. The method may further comprise the step of providing a measurement signal which corresponds to the operating voltage of the electrical loads. The method may also further comprise the step of to predetermining the reference variable as a function of the input measurement signal, in order to provide higher-level operating voltage regulation. The reference variable which is dependent on the measurement signal can be predetermined periodically, wherein the period being shorter than the stabilization time of a control loop which is formed by the step of providing the control signal.

The invention provides for the regulator to provide a regulation characteristic such that, starting from the normal state, a sudden reduction in the operating voltage for the electrical loads from the rated voltage to a rated minimum voltage (in particular for example 40% to 60% of the rated voltage) which is necessary for operation of the loads leads to a rise in the supply current by at least 20% of the maximum supply current which can be provided by means of the power generating circuit.

The expression "maximum supply current which can be provided by means of the power generating circuit" refers to a current which can be supplied by the power generating circuit continuously, without any damage or destruction to circuit components.

The design of the control characteristic that is provided according to the invention is not matched to a control error that is as small as possible (for example high proportional gain) as in the case of known power supply devices. In fact, when using a proportional regulator, for example, the proportional gain is chosen to be as small as possible, but at least sufficiently high that the system is just sufficiently damped at all operating points. The proportional component of the regulation characteristic is thus used only for damping the system (possibly including a higher-level path) which can oscillate in some circumstances. With this design, the system reacts to a disturbance variable with a proportional regulation error that is dependent on the chosen proportional gain.

A low proportional gain results in a large control error and, when higher-level regulation is present, in a small reaction from the higher-level path. If the requirements for the accuracy of the operating voltage regulation are not so stringent, then, in some circumstances, higher-level voltage regulation can be entirely omitted. Since the system according to the invention reacts automatically to disturbances, the design of a higher-level regulator is less critical. In particular, it can be designed to be comparatively slow, with control errors nevertheless occurring during transient processes (sudden load changes) as could be achieved only by means of a very fast higher-level voltage regulator with the conventionally used high proportional gain from the current regulator.

One preferred embodiment provides for the control signal which is provided by the regulator to vary essentially linearly with the input signal difference of the regulator. The regulator can thus in the simplest case be in the form of a pure proportional regulator (with a low proportional gain). In this situation, there is therefore advantageously no need for any integrator reset circuit (see FIGS. 1 and 2).

However, this does not preclude the provision of an integral component as well, in particular by comparatively small integral component in the regulator characteristic. In this situation as well, the sudden reduction in the operating voltage mentioned above will, according to the invention, first of all result in the supply current rising by at least 20% of the maximum supply current.

However, if no integral component is provided (and no higher-level voltage regulation is provided either), then this sudden reduction leads to the supply current stabilizing at a value which is at least 20% of the maximum supply current higher than the value of the supply current in the normal state.

With regard to the preferred application for the purposes of the invention in the form of a DC/DC converter, in particular for a motor vehicle, an embodiment is preferred in which the reference signal is provided by a programmable digital control device (for example a microcontroller). A measurement signal which corresponds to the operating voltage of the electrical loads and which can be used, for example, for providing higher-level operating voltage regulation can be input to a control device such as this. In this case, it is preferable for the reference variable which is dependent on the voltage measurement signal to be predetermined periodically by the control device, with the period being shorter than the stabilization time of the control loop which is formed by the regulator and the power generating circuit. This leads to more stable maintenance of the rated voltage as desired by the regulation, at the output of the power generating circuit. In this context, it is worth mentioning that the relatively small proportional component of the regulator means that the speed of the control device is subject to comparatively minor requirements.

In the case of a DC/DC converter according to the invention for the application described with reference to FIG. 1, a battery at the output of the power generating circuit can advantageously be dispensed with with no significant adverse effect on the practically relevant performance characteristics.

The invention will be described in more detail in the following text using an exemplary embodiment and with reference to FIG. 3. In this case, the same reference numbers are used for components having the same effect, in each case followed by the lower-case letter a. The description covers essentially only the differences from the embodiments described initially with reference to the prior art and, apart from this, express reference is made to the method of operation of components that have already been described.

DETAILED DESCRIPTION OF THE PREFERRED EMBODIMENTS

Figure 3:
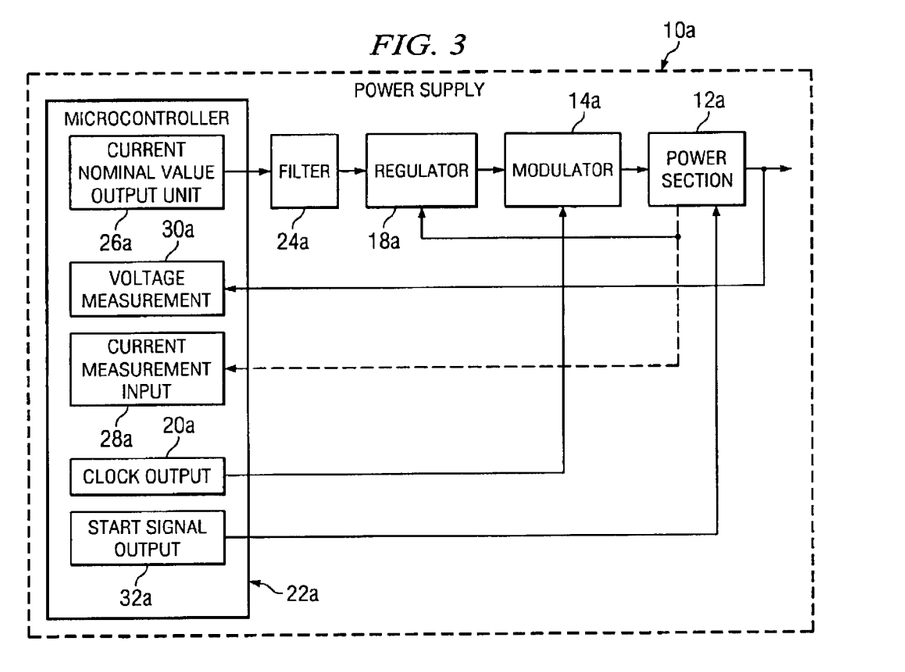
FIG. 3 shows a schematic block diagram of a power supply device according to the invention.

FIG. 3 shows, schematically, a power supply device 10a according to the invention, comprising a power generating circuit 12a, a regulator 18a and a reference device (which is formed from a current nominal value preset unit 26a and a filter 24a) for providing a reference signal for the regulator 18a. In contrast to the power supply device which has been described with reference to FIG. 1, the embodiment which is illustrated in FIG. 3 has no integrator reset circuit for resetting an integrator within the regulator 18a. The regulator 18a is a pure proportional regulator so that, in the illustrated example, any control error at the input of the regulator is not regulated out. A further difference from the embodiment which has been described with reference to FIG. 1 is that the proportional gain of the regulator 18a is relatively low, specifically such that, starting from a normal state, in which the supply current at the output of the power generating circuit 12a is provided for the electrical loads which are operated with the rated voltage, a sudden reduction in this output voltage to 50% of the rated voltage leads to a rise in the supply current (and hence to a control error) which is stabilized by the adjustment of the control signal (PWM signal) by the regulator 18a at about 90% to 100% of the maximum supply current which can be provided by means of the power generating circuit 12a.

The proportional gain is used only for oscillation damping and not for current regulation that is as rapid as possible, as in the case of the embodiment in FIG. 1.

Higher-level voltage regulation is preferably provided by means of the microcontroller 22a, in the process of which, as illustrated, the instantaneous operating voltage is input to the microcontroller 22a (at 30a) and is used for periodic readjustment of the nominal value which is predetermined by the unit 26a. This higher-level regulation can advantageously be designed to be comparatively slow, so that the circuitry complexity is reduced both with regard to the components that are arranged outside the microcontroller 22a and with regard to the microcontroller 22a itself. Despite this simplification, the illustrated device 10a is in practice suitable, for example, for providing a DC/DC converter with adequate regulation accuracy and an adequate regulation rate for a motor vehicle, even when the vehicle power supply system which is supplied in this way is not buffered by a battery or a particularly large capacitor.

Figure 4:
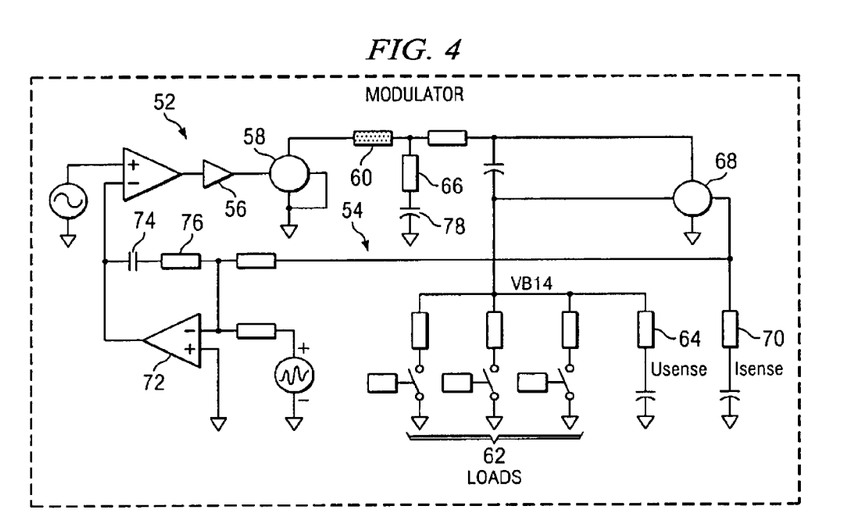
FIG. 4 shows a circuit arrangement for comparison of the response of low-proportional regulation according to the invention with the response of conventional proportional/integral regulation.

FIG. 4 shows a simulation circuit arrangement by means of which various power supply devices were simulated and were compared with one another. A modulator 52 can be seen at the top on the left, comprising a sawtooth-waveform oscillator and a comparator for comparison of the sawtooth-waveform signal with a regulation signal which originates from a feedback path 54. The PWM signal which is generated as the control variable is passed from the output of the comparator via a delay element 56 to the input of a voltage controlled voltage source ("vcvs") 58, which simulates the power stage of a power generating circuit, which is normally formed from switching transistors. An inductor 60 can also be seen in the simulation arrangement, via which a current is supplied to a parallel arrangement 62 of load resistors which can be connected individually for simulation purposes. VB14 denotes the operating voltage which is applied to the simulated loads and which is also provided, in a filtered form, as Usense by means of a parallel-connected filter 64. A shunt resistor 66 is used for tapping off a voltage which is proportional to the supply current and which is supplied via a further voltage controlled voltage source 68 to a further filter 70, at which a voltage Isense is shown that is proportional to the supply current. 72 denotes the control amplifier which is used for simulation purposes, with an integration capacitor 74 and a resistor network 76 for definition of the regulation characteristic of the amplifier 72. In order to simulate a pure proportional response, the capacitance of the capacitor 74 was set to a very high value, so that any integration component (in the simulated time period) is negligible.

FIG. 5 shows simulation results which illustrate that a satisfactory power supply device response can be achieved by using the control amplifier 72 as a pure proportional amplifier with a comparatively low proportional gain.

FIGS. 5a–5d each show different signals plotted against time, with a sudden increase in the load being simulated at the time t=0.001 s.

Figure 5A:
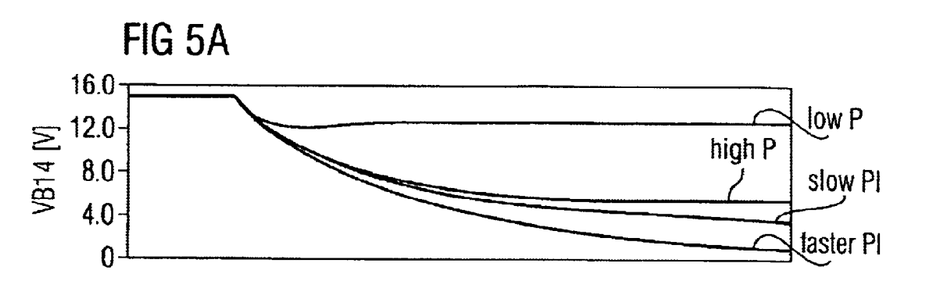
FIG. 5 shows simulated waveforms of signals relating to the circuit arrangement illustrated in FIG. 4.

FIG. 5a shows the waveform of the operating voltage VB14 for a fast PI regulator (faster PI), for a slow PI regulator (slow PI), for a proportional regulator with high gain (high P) and for a proportional regulator with low gain (low P). This shows that the operating voltage has better stability with the pure proportional characteristic, in particular with a low gain.

Figure 5B:
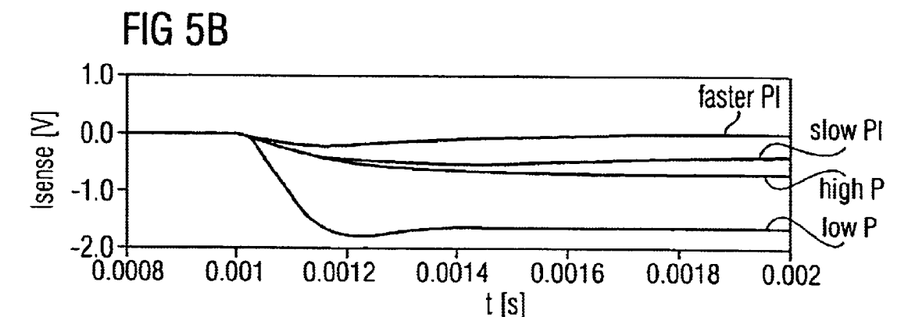

FIG. 5b shows the corresponding waveforms of the voltage Isense, which corresponds to the supply current, for the same regulation characteristics. This shows that pure proportional characteristics result in a control error with regard to the supply current while, in contrast, this control error is regulated out when using PI characteristics in the time profile.

Figure 5C:
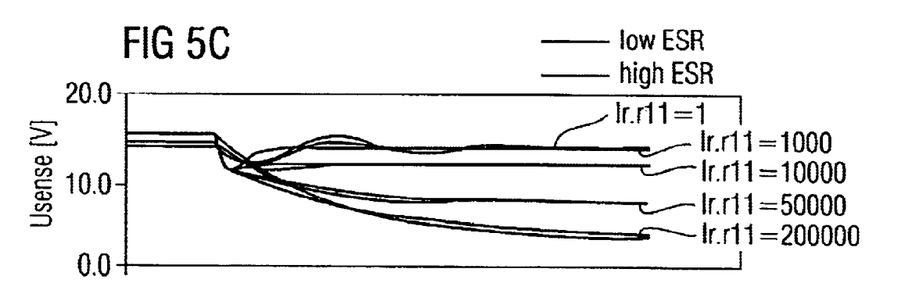
Figure 5D:
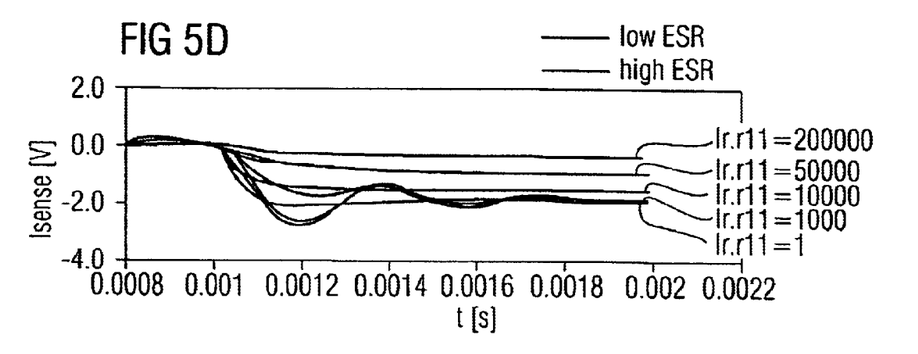

FIGS. 5c and 5d show profiles of the operating voltage (FIG. 5c) smoothed by means of the filter 64 and of the supply current (FIG. 5d) smoothed by means of the filter 70, in each case plotted for various resistances in the resistor network 76, which are specified in the figures by the parameter Ir.r11, with a small value indicating a low proportional gain. The profiles were simulated for five different proportional gains, with the esr (equivalent series resistance) value of an output capacitor 78 in the simulated power generating circuit also being varied for each gain. These profiles show that an oscillation occurs not only in the operating voltage profile but also in the supply current profile for a very low proportional gain (Ir.r11=1), which should be avoided, and is avoided by a somewhat higher proportional gain (Ir.r11=1000).

In summary, a PI regulator allows the current error to be kept small while, in contrast, a proportional regulator leads to a comparatively high current error. In consequence, the voltage falls very severely when using a PI regulator while, in contrast, this drop in the voltage is largely avoided by using a proportional regulator with a low proportional gain. If the proportional gain of the regulator is chosen to be excessively low, then any oscillation in the system is not adequately damped, particularly when the ESR value of the output capacitor is small. The proportional gain is preferably chosen to be just sufficiently high that the oscillation is damped but that the voltage-stabilizing effect is still high.

One preferred application of the invention is for DC/DC conversion for a two-voltage power supply system, in particular a 42 V/14 V power supply system in a motor vehicle, in which the power supply system on the output side is not buffered by a vehicle battery. In this case, it is possible to operate the converter even without any additional voltage regulation loop, by using a regulator with a proportional characteristic with a low gain.

What is claimed is:

1. A power supply device for provision of a supply current for electrical loads which can be operated at a rated voltage, comprising
   a power generating circuit which is supplied with a predetermined voltage that is not the same as the rated voltage and to which a control signal is input, in order to provide the supply current for the electrical loads as a function of the control signal,
   a regulator to which a reference signal, which corresponds to a predetermined reference variable, and a regulation signal, which corresponds to the supply current that is provided, are input, in order to provide the control signal with a control signal component which varies linearly with an input signal difference of the regulator, and
   a reference device for provision of the reference signal, wherein the power supply device provides a normal state in which the supply current is provided for the electrical loads which are operated at the rated voltage and the input signal difference of the regulator is zero, and wherein the regulator provides a regulation characteristic such that, starting from the normal state, a sudden reduction in the operating voltage for the electrical loads from the rated voltage to a rated minimum voltage which is necessary for operation of the loads leads to a rise in the supply current by at least 20% of the maximum supply current which can be provided by means of the power generating circuit.

2. The power supply device as claimed in claim 1, in which the control signal which is provided by the regulator varies essentially linearly with an input signal difference of the regulator.

3. The power supply device as claimed in claim 1, in which the power generating circuit is in the form of a PWM-controlled switch-mode power supply.

4. The power supply device as claimed in claim 1, in which the control signal which is provided by the regulator, is input to the power generating circuit as a PWM signal.

5. The power supply device as claimed in claim 4, in which the control signal is provided by the regulator as an analog signal, and is converted to the PWM signal by means of a PWM modulator which is connected downstream from the regulator.

6. The power supply device as claimed in claim 1, in which the reference signal is provided as the PWM signal by a control device, in particular by a programmable digital control device.

7. The power supply device as claimed in claim 1, in which the reference signal which is provided by the control device is converted to an analog reference signal by means of a filter which is connected downstream from the control device, and is input to the regulator as an analog signal.

8. The power supply device as claimed in claim 6, in which a measurement signal which corresponds to the operating voltage of the electrical loads is input to the control device.

9. The power supply device as claimed in claim 7, in which a measurement signal which corresponds to the operating voltage of the electrical loads is input to the control device.

10. The power supply device as claimed in claim 8, in which the control device is designed to predetermine the reference variable as a function of the input measurement signal, in order to provide higher-level operating voltage regulation.

11. The power supply device as claimed in claim 9, in which the control device is designed to predetermine the reference variable as a function of the input measurement signal, in order to provide higher-level operating voltage regulation.

12. The power supply device as claimed in claim 10, in which the reference variable which is dependent on the measurement signal is predetermined periodically by the control device, with the period being shorter than the stabilization time of the control loop which is formed by the regulator and the power generating circuit.

13. The power supply device as claimed in claim 11, in which the reference variable which is dependent on the measurement signal is predetermined periodically by the control device, with the period being shorter than the stabilization time of the control loop which is formed by the regulator and the power generating circuit.

14. A method for provision of a supply current for electrical loads which can be operated at a rated voltage, comprising the steps of:
   providing a predetermined voltage that is not the same as the rated voltage;
   providing the supply current for the electrical loads as a function of a control signal,
   providing a reference signal, which corresponds to a predetermined reference variable, and a regulation signal, which corresponds to the supply current,
   providing the control signal with a control signal component which varies linearly with an input signal difference of the reference signal and the regulation signal,
   wherein during a normal state the supply current is provided for the electrical loads which are operated at the rated voltage and the input signal difference of the reference signal and the regulation signal is zero, and during a regulation state, starting from the normal state, a sudden reduction in the operating voltage for the electrical loads from the rated voltage to a rated minimum voltage which is necessary for operation of the loads leads to a rise in the supply current by at least 20% of the maximum supply current which can be provided.

15. The method as claimed in claim 14, wherein the control signal varies essentially linearly with an input signal difference of the reference signal and the regulation signal.

16. The method as claimed in claim 14, wherein the control signal is provided as an analog signal, and is converted to a PWM signal by means of a PWM modulator.

17. The method as claimed in claim 14, wherein the reference signal is converted to an analog reference signal by means of a filter.

18. The method as claimed in claim 14, further comprising the step of providing a measurement signal which corresponds to the operating voltage of the electrical loads.

19. The method as claimed in claim 18, further comprising the step of to predetermining the reference variable as a function of the input measurement signal, in order to provide higher-level operating voltage regulation.

20. The method as claimed in claim 19, wherein the reference variable which is dependent on the measurement signal is predetermined periodically, wherein the period being shorter than the stabilization time of a control loop which is formed by the step of providing the control signal.

* * * * *